Jan. 12, 1960  C. V. THROWER  2,921,256
ELECTRICAL TEST CIRCUIT
Filed Feb. 10, 1954  2 Sheets-Sheet 2

INVENTOR
CLEO V. THROWER

BY
ATTORNEYS

United States Patent Office 2,921,256
Patented Jan. 12, 1960

2,921,256

ELECTRICAL TEST CIRCUIT

Cleo V. Thrower, Silver Spring, Md., assignor to the United States of America as represented by the Secretary of the Navy Application February 10, 1954, Serial No. 409,542

4 Claims. (Cl. 324—57)

(Granted under Title 35, U.S. Code (1952), sec. 266)

This invention described herein may be manufactured and used by or for the Government of the United States of America for governmental purposes without the payment of any royalties thereon or therefor.

This invention relates to electrical test circuits and, more particularly, to circuits suitable for the study of the delayed response time of electronics devices.

In the design and construction of electronic devices, it is often desirable to determine the inherent delay time of the circuit, that is, the time delay between the application of a signal to the electronic device and its response to that signal.

The methods formerly used to determine this time delay included the use of a synchronous motor and a cam driven switch. An arrangement of that type has very definite frequency response limitations, such that the system will not respond to the high frequency appearing in many electronic devices.

The present invention includes only electronic circuits and is therefore capable of responding to a very much higher frequency range than the mechanical system used in the past.

It is therefore an object of this invention to provide a novel test circuit for indicating delay in the response time of an electronic device.

Another object of this invention is to provide a test circuit whose output contains no direct current components.

Another object of this invention is to provide a test circuit in which the output pulse may be modulated.

Other objects of the invention will become clear from the following descriptions and claims which disclose by way of examples the principles of the invention and the best mode provided and contemplated in applying these principles.

The invention may be best understood by reference to the following description taken in connection with which:

Fig. 3 is a view of an oscilloscope display of the unmodulated output of the test circuit and the output of a magnetic amplifier; and Fig. 4 is a view of an oscilloscope display of the modulated output of the test circuit and the output of a magnetic amplifier.

Figure 1:
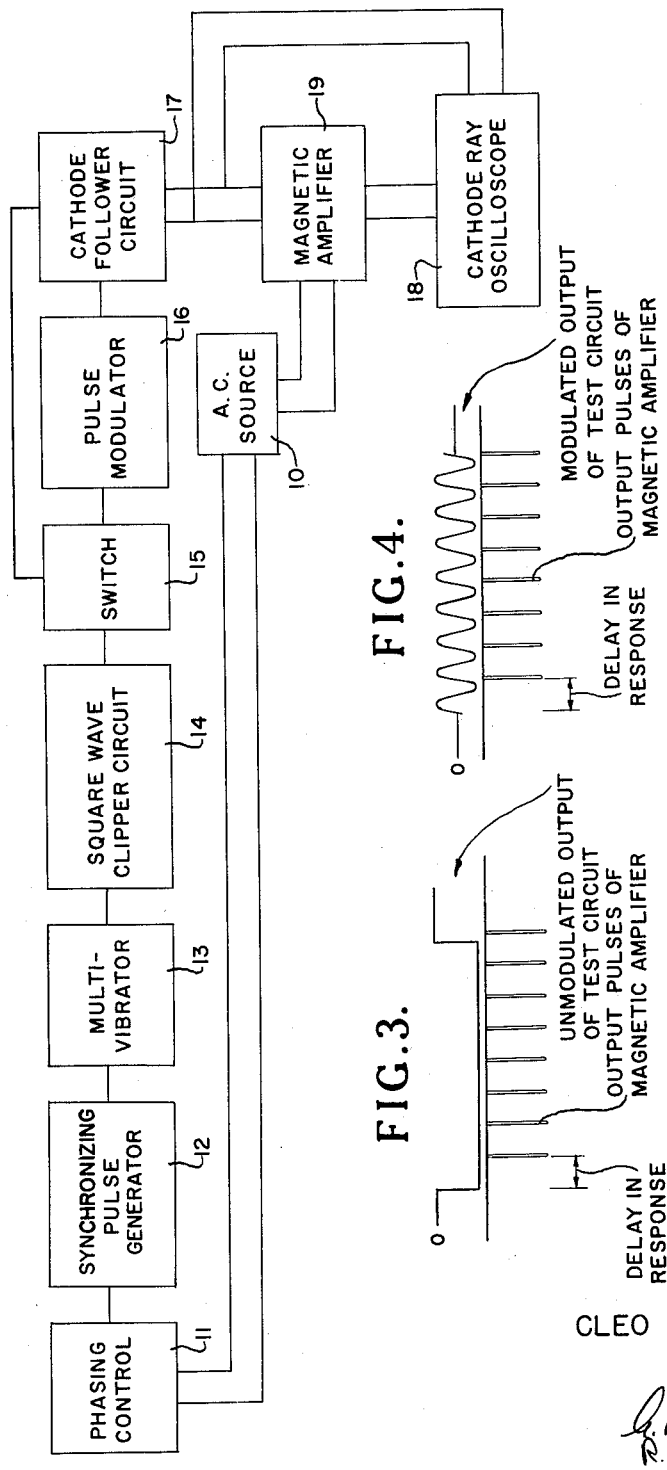
Fig. 1 is a block diagram of a preferred embodiment of the invention.

Referring now to Fig. 1, there is shown a source of alternating current, 10, which supplies the power for both the test circuit and the device being tested and provides the synchronizing frequency for the test circuit. The test circuit comprises a phasing or phase shift control, 11, which is coupled to a synchronizing pulse generator, 12. Phasing control 11 makes it possible to vary the phase relationship between the control current applied through the test circuit to the tested device, such as a magnetic amplifier, and the power applied to the tested device. This phase relationship affects the time of firing of the magnetic amplifier and adds to the flexibility of the test device.

The synchronizing pulse generator is used to control the operation of a multivibrator, 13, which is of the type having a wide frequency response range. The synchronous pulse generator produces a pulse which fires the multivibrator and thus stabilizes the frequency of the multivibrator output. The output of the multivibrator is fed through a two stage clipper circuit, 14, so that the pulse wave form at the output of the clipper circuit, 14, is a square wave of very good form. Following the clipper circuit, there is a switch, 15, which in one position applies a square wave to the pulse modulator circuit, 16, and in the other position applies the output of the multivibrator and clipping circuits directly to a cathode follower circuit, 17. The cathode follower circuit is constructed, as will appear subsequently, to produce an output which is free from any D.-C. component. The output of this cathode follower circuit is applied both to the device under test, 19, and directly to the cathode ray oscillograph circuit, 18, the oscillograph circuit being of the type capable of simultaneously displaying two outputs whose sweep rates are coincidental. With one of the two cathode ray display circuits connected to the output of the test circuit, the other display circuit of the cathode ray oscillograph is connected to the output of the device being tested.

Since the signal from the cathode follower, 17, is applied simultaneously to the oscillograph, 18, and to the device, 19, and the output of the device is also applied to the oscillograph, any phase shift appearing in the display of the oscillograph between the signal from the cathode follower, 17, and the output of this device, 19, is an indication of the delay time in the response to the device 19. The value of this delay may be calculated from a knowledge of the frequency of the multivibrator and the modulating circuit, or the screen of the oscillograph may be calibrated.

Figure 2:
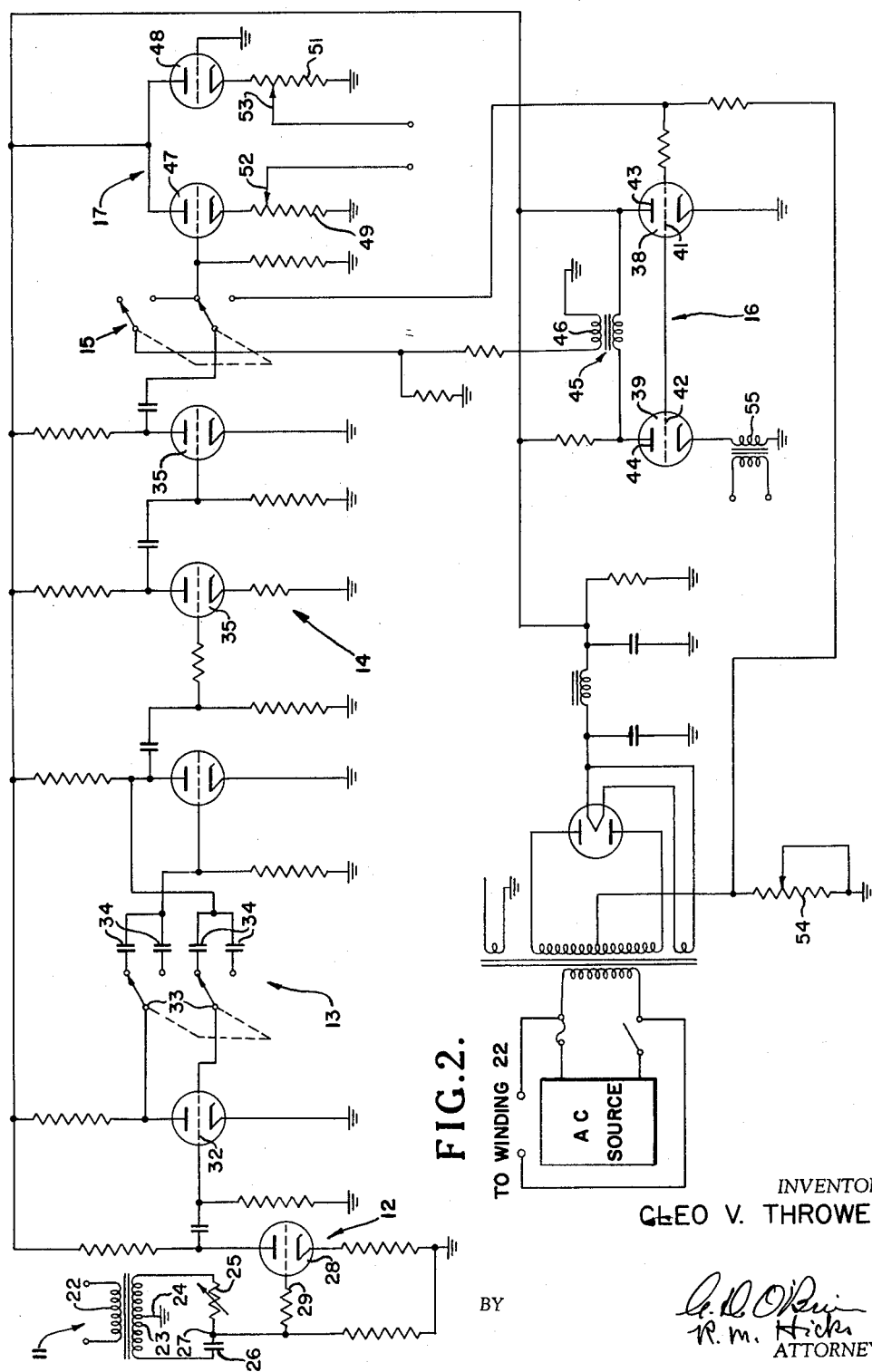
Fig. 2 is a schematic diagram of the test circuit embodying the present invention.

Referring now to Fig. 2, the shift control, 11, comprises a transformer connected to the power source, 10, Fig. 1, and having a secondary, 23, with a grounded center tap, 24. The secondary has connected across it a variable resistor, 25, and a condenser, 26. From a point, 27, between the variable resistor, 25, and the condenser, 26, the output of the phase control circuit is applied to the control grid, 29, of the synchronizing pulse generator, 28, which generates a flat top half-wave pulse. This pulse is applied to the control grid, 32, of one side of the multivibrator 13 to synchronize and stabilize the frequency of the multivibrator. This frequency is thus synchronized with a multiple of the power frequency applied to the device under test. If it is desired, there may be provided a ganged switch, 33, and a plurality of capacitors, 34, for varying the resistance-capacity constants of the multivibrator 13 and thereby varying its synchronizing frequency, which will be lower than the synchronizing frequency. The output from the multivibrator 13 is fed through the two clipping stages, 35, to improve the wave form. The output of the final clipping stage may be fed to the grids of the modulator circuit, 16, to trigger that circuit, or may be fed directly to the first cathode follower output stage, 47, of the cathode follower circuit, 17. If the signal is applied to the modulating circuit, it is applied simultaneously to both control grids, 41, 42, respectively, of the modulating circuit, 16. The modulating circuit comprises a first and a second tube which are normally biased to cutoff but which are triggered to fire when the square wave is applied to the grid circuit. The cathodes of both tubes are biased with reference to a plate by a resistor, 54. The cathode of tube 39 has inserted in its circuit a transformer coupling, 55, for introducing a modulating frequency. Connected between the plates, 43, 44, of the two tubes, 38 and 39, respectively, there is a transformer, 45, whose secondary, 46, is connected between ground and the control grid of the cathode follower output, 17.

The cathode follower output circuit, 17, comprises a first tube, 47, and a second tube, 48, connected in parallel as cathode followers. Each of the cathode follower tubes has at least plate, grid and cathode electrodes. The grid of tube 47 is connected either directly to the output of the clipper circuit or to the output of the modulating circuit while the grid of tube 48 is connected directly to ground. The plate of tubes 47 and 48 are connected together and the cathodes are connected through resistances 49 and 51, respectively, to ground. The output for the test circuit is taken from the cathode resistors, 49, 51, of the two cathode follower tubes, 47 and 48. One or both of the output contacts, 52, 53, may be adjustable so that the output circuit may be balanced to eliminate all direct current components from the output signal. This output, as shown in Fig. 1, is connected to the catnode ray oscillograph, 18, and to the device being tested, 19. These outputs would be taken from terminals 56 and 57 shown in Fig. 2.

In the operation of the test circuit, the power frequency from the common source is applied to the primary, 22, of the phasing control, 11. The output of the phasing control circuit, 11, is applied to the grid 29 of tube 28 to cause the tube to fire at a desired point in the power cycle. The firing of tube 28 synchronizes the operation of the multivibrator, 13, with the desired point in the power cycle. The form of the square wave produced by the multivibrator is further improved by passing it through the clipping circuits of tubes 35. This square wave is then either applied directly to the cathode follower circuit, 17, or is applied through the modulator circuit, 16, to the cathode follower circuit, 17. When the square wave or pulse from the multivibrator is applied to the modulator circuit it is applied simultaneously to the grid of tubes 38 and 39 which are normally biased beyond cutoff. When the square wave appears on these grids, it causes both tubes to conduct simultaneously. As long as no signal appears on the control grids 41, 42, the modulating voltage, which is continuously applied to the modulating transformer 55 produces no difference in potential between the plates 43 and 44 of the two tubes. However, when the square wave is impressed on the control grids 41, 42 there is produced a varying potential difference between the plates 44 and 43 thereby causing the current to flow through transformer 45. The signal induced in the secondary 46 of transformer 45 is then applied to the grid of tube 47 of the cathode follower circuit, 17. Tubes 47 and 48 have their cathode resistors adjusted so that when no signal appears on the grid of tube 47 they conduct substantially equally. However, when a signal appears on the grid of tube 47, the conductance of that tube is varied and there appears a varying voltage across the cathode resistance 49. By varying the position of contact 52 along the resistance 49, the level of the output circuit may be controlled. The position of contact 53 along the resistance 51 should be adjusted so that when there is no signal appearing on the grid of tube 47, no voltage appears across the output terminals. However, when a signal appears on the grid of tube 47, a difference in the flow of current through the cathode resistance 49 from that through resistance 51 causes a potential difference between the output terminals of the test circuit.

In one case in which this invention has been employed, the device being tested was a magnetic amplifier to whose control circuit the output of this test circuit was applied and the delay in response was observed on a cathode ray oscilloscope as seen in Figs. 3 and 4.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A test circuit for displaying the response time delay of a magnetic amplifier comprising a source of alternating current input voltage connected to both said test circuit and said magnetic amplifier, a multivibrator having an input and an output, said multivibrator being connected to be driven from said source, phase control means connected from said common voltage source to the input of said multivibrator to selectively determine the point on the cycle of said source at which said multivibrator operates, means selectively connected to said multivibrator for modulating the output of the multivibrator, a cathode follower circuit means operable to selectively connect said cathode follower circuit to receive either the output of said modulating means or the unmodulated output of said multivibrator, a cathode ray tube connected directly to the output of said cathode follower, means directly connecting said magnetic amplifier between the output of said cathode follower and said cathode ray tube to simultaneously display both the output of said cathode follower and of said magnetic amplifier with concident sweep rates.

2. A test circuit for displaying the response time delay of a magnetic amplifier having a power circuit and control circuit under test comprising, in combination, a source of alternating current, means for generating cyclically recurring square waves upon electrical energization thereof and having an input circuit and an output circuit, said input circuit being connected to receive electrical energization from said source, circuit connections from said source connected to energize the power circuit of the amplifier under test, phase control means connected between said source and said generating means for determining the instants of initiation of the square waves generated by said generating means, circuit means connecting said output circuit to the control circuit of the magnetic amplifier under test, cathode ray display means directly and continuously connected for energization from both said output circuit and said magnetic amplifier while said amplifier is under test whereby said display means provides simultaneous visual indications of the energizations applied thereto from said amplifier and output circuit to therefrom enable determination of the response time delay of the amplifier.

3. A test circuit as claimed in claim 2 in which said generating means comprises a pulse generator connected to be driven from said phase control means, a multivibrator connected to be triggered by said pulse generator, and means for clipping the output of said multivibrator.

4. A test circuit as claimed in claim 2 in which said output circuit comprises a pair of cathode follower circuits connected in parallel, said cathode follower circuits having individually adjustable output contacts to permit the balancing thereof.

References Cited in the file of this patent

UNITED STATES PATENTS

| 2,285,038 | Loughlin | June 2, 1942 |
| 2,414,477 | Meacham | Jan. 21, 1947 |
| 2,419,576 | Levy | Apr. 29, 1947 |
| 2,471,530 | Lobel | May 31, 1949 |
| 2,504,852 | Lewis | Apr. 18, 1950 |
| 2,554,806 | Beagles | May 29, 1951 |

OTHER REFERENCES

Geyger: "Magnetic Amplifier Transient Analyzer" Electronics, July 1953, pp. 189–191. (Copy in Scientific Library or Div. 48.)